US009967787B2

(12) United States Patent
Rexhepi

(10) Patent No.: US 9,967,787 B2
(45) Date of Patent: *May 8, 2018

(54) METHOD, APPARATUS AND COMPUTER PROGRAM PRODUCT FOR TRANSFER OF CAPABILITY SUPPORT INFORMATION IN A MULTI-RAT ENVIRONMENT

(71) Applicant: Nokia Technologies Oy, Espoo (FI)

(72) Inventor: Vlora Rexhepi, Den Hoorn (NL)

(73) Assignee: Nokia Technologies Oy, Espoo (FI)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/369,662

(22) Filed: Dec. 5, 2016

(65) Prior Publication Data

US 2017/0118681 A1 Apr. 27, 2017

Related U.S. Application Data

(63) Continuation of application No. 14/705,236, filed on May 6, 2015, now Pat. No. 9,544,824, which is a continuation of application No. 13/148,924, filed as application No. PCT/IB2010/000259 on Feb. 10, 2010, now Pat. No. 9,042,340.

(Continued)

(51) Int. Cl.
*H04W 4/00* (2009.01)
*H04W 36/00* (2009.01)
(Continued)

(52) U.S. Cl.
CPC ..... *H04W 36/0066* (2013.01); *H04W 36/005* (2013.01); *H04W 36/08* (2013.01); *H04W 88/06* (2013.01); *H04W 88/08* (2013.01)

(58) Field of Classification Search
CPC ........... H04W 36/0066; H04W 36/005; H04W 36/08; H04W 8/06
See application file for complete search history.

(56) References Cited

U.S. PATENT DOCUMENTS

2005/0227687 A1* 10/2005 Drevon .................. H04W 8/06
455/432.1
2007/0036109 A1* 2/2007 Kwak ............... H04W 36/0066
370/331

(Continued)

OTHER PUBLICATIONS

Email discussion prior to 3GPP TSG-RAN2 Meeting #64bis, ljubljana, Slovenia, Jan. 12-16, 2009, Date: Wed, Jan. 7, 2009, 10:00:56+0100, Reply to: "Pudney, Chris, VF-Group", From: "Pudney, Chris, VF-Group", Subject: Re: [64-LTE-14] Inter-RAT UE Capability handling, Comments: to: Tomas Hedberg; Comments: cc: "Golaup, Assen, VF-Group" (retrieved from the Internet on May 4, 2010, http:/llist.etsi.org/scripts/wa.exe.?<http://llist.etsi.org/scripts/wa.exe?> A2=ind0901&L=3GPP_TSG_RAN_WG2& P=R49197&I=3].

(Continued)

*Primary Examiner* — Wei Zhao
(74) *Attorney, Agent, or Firm* — Mintz Levin Cohn Ferris Glovsky and Popeo, P.C.

(57) ABSTRACT

An apparatus for enabling transfer of mobile terminal inter-RAT capabilities in a multi-RAT environment from the perspective of the capability provider may include at least one processor and at least one memory including computer program code. The at least one memory and the computer program code may be configured, with the processor, to cause the apparatus to perform at least receiving an indication of a request for mobile terminal inter-RAT capability information relative to a particular RAT, acquiring the inter-RAT capability information in response to receipt of the indication of the request for inter-RAT capability information, and providing the inter-RAT capability information to a target base station.

12 Claims, 9 Drawing Sheets

Related U.S. Application Data

(60) Provisional application No. 61/151,307, filed on Feb. 10, 2009.

(51) Int. Cl.
    *H04W 36/08*     (2009.01)
    *H04W 88/06*     (2009.01)
    *H04W 88/08*     (2009.01)

(56) References Cited

U.S. PATENT DOCUMENTS

| | | | |
|---|---|---|---|
| 2010/0195616 A1 | 8/2010 | Vikberg et al. | |
| 2010/0278150 A1* | 11/2010 | Park | H04W 36/0016 370/332 |
| 2010/0285803 A1 | 11/2010 | Persson et al. | |
| 2011/0310844 A1 | 12/2011 | Rexhepi | |

OTHER PUBLICATIONS

3GPP TSG-RAN2 Meeting #64bis, updates to R2-090219 by Chris Pudney prior to meeting in Ljubljana, Slovenia, Jan. 12-16, 2009.

TSG-RAN WG2 Meeting #64bis R2-090217, Ljubljana, Slovenia, Jan. 12-16, 2009, Agenda Item: 4.1 Source: Ericsson Title: Summary of [64-LTE-14] Email Discussion on Inter-RAT UE capability handling.

3GPP TS 23.401 V8.4.1 (Dec. 2008), Technical Specification 3rd Generation Partnership Project; Technical Specification Group Services and System Aspects; General Packet Radio Service (GPRS) enhancements for Evolved Universal Terrestrial Radio Access Networks (E-UTRAN) access (Release 8).

3GPP, "Technical Specification Group GSM/EDGE Radio Access Network; General Packet Radio Service (GPRS); Base Station System (BBS)-Serving GPRS Support Node (SGSN); BSS GPRS Protocol (BSSGP) (Release 9)," 3rd Generation Partnership Project, 3GPP TS 48.018 V9.0.0, Dec. 2009.

3GPP, "Technical Specification Group GSM/EDGE Radio Access Network; Packet-switched handover for GERAN A/Gb mode; Stage 2 (Release 9)," 3rd Generation Partnership Project, 3GPP TS 43.129 V9.0.0, Dec. 2009.

3GPP, "Technical Specifiication Group Core Network and Terminals; Mobile radio interface Layer 3 specification; Core network protocols; Stage 3 (Release 9)," 3rd Generation Partnership Project, 3GPP TS 24.008 V9.1.0, Dec. 2009.

* cited by examiner

195

| PDU type | PDU type/11.3.26 | M | V | 1 |
|---|---|---|---|---|
| TLLI | TLLI/11.3.35 | M | TLV | 6 |
| IMSI | IMSI/11.3.14 | M | TLV | 5-10 |
| Target Cell Identifier (note 1) | Cell Identifier/11.3.9 | O | TLV | 10 |
| Request for UTRAN INTER RAT HANDOVER INFORMATION (note 2) | Request Indicator/n.n.n | C | TLV | 1 |
| Request for E-UTRAN INTER RAT HANDOVER INFORMATION (note 2) | Request Indicator/n.n.n | C | TLV | 1 |
| NOTE 1: The Target Cell Identifier IE is included only for optimised Intra-BSS PS Handover. | | | | |
| Note 2: This bit is set only if the INTER RAT HANDOVER INFORMATION for UTRAN or E-UTRAN is missing from the Source BSS to Target BSS transparent container received from the source RAT | | | | |

| Information elements | Type/Reference | Presence | Format | Length |
|---|---|---|---|---|
| PDU type | PDU type/n.n.n | M | V | 1 |
| TLLI | TLLI/11.3.35 | M | TLV | 6 |
| UTRAN INTER RAT HANDOVER INFORMATION (note 1) | Inter RAT Handover Information/11.3.94 | C | TLV | 3-? |
| Request for E-UTRAN INTER RAT HANDOVER INFORMATION (note 1) | E-UTRAN Inter RAT Handover Information/n.n.n | C | TLV | 3-? |
| Note 1: At least one of this IEs will be present | | | | |

*FIG. 7*

METHOD, APPARATUS AND COMPUTER PROGRAM PRODUCT FOR TRANSFER OF CAPABILITY SUPPORT INFORMATION IN A MULTI-RAT ENVIRONMENT

CROSS REFERENCE TO RELATED APPLICATIONS

This application is a continuation application of U.S. patent application Ser. No. 14/705,236, filed May 6, 2015, entitled "METHOD, APPARATUS AND COMPUTER PROGRAM PRODUCT FOR TRANSFER OF CAPABILITY SUPPORT INFORMATION IN A MULTI-RAT ENVIRONMENT," which is a continuation application of U.S. patent application Ser. No. 13/148,924, filed Aug. 10, 2011, now U.S. Pat. No. 9,042,340, issued May 26, 2015, entitled "METHOD, APPARATUS AND COMPUTER PROGRAM PRODUCT FOR TRANSFER OF CAPABILITY SUPPORT INFORMATION IN A MULTI-RAT ENVIRONMENT," which is a national stage application, filed under 35 U.S.C. §371, of PCT Application No. PCT/IB2010/000259, filed Feb. 10, 2010, entitled "METHOD, APPARATUS AND COMPUTER PROGRAM PRODUCT FOR TRANSFER OF CAPABILITY SUPPORT INFORMATION IN A MULTI-RAT ENVIRONMENT," which claims priority to U.S. Provisional Application No. 61/151,307, filed Feb. 10, 2009, entitled "METHOD, APPARATUS AND COMPUTER PROGRAM PRODUCT FOR TRANSFER OF CAPABILITY SUPPORT INFORMATION IN A MULTI-RAT ENVIRONMENT." The contents of all of the aforementioned applications are hereby incorporated by reference in their entirety.

TECHNOLOGICAL FIELD

Embodiments of the present invention relate generally to information transfer technology in a multiple radio access technology (RAT) environment and, more particularly, relate to an apparatus, method and a computer program product for enabling the transfer of information regarding the capabilities of a transferred terminal between different RATs.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Such increased ease of information transfer and convenience to users has recently been accompanied by an increased ability to provide mobile communications at a relatively low cost. Accordingly, mobile communication devices are becoming ubiquitous in the modern world. With the rapid expansion of mobile communications technology, there has been a related rapid expansion in those services that are demanded and provided via mobile communication devices.

Over the history of mobile communications, there have been many different generations of systems developed to enable the use of such communication devices. The first generations of these systems were sometimes developed independently and, at least initially, were not necessarily usable in cooperation with other systems. However, cooperation between communication system developers began to be employed so that new technologies could be enabled to have the potential for synergistic cooperation with other technologies in order to increase overall capacity. Thus, a mobile terminal operable in second generation (e.g., 2G) systems such as GSM (global system for mobile communications) or IS-95, which replaced the first generation of systems, may in some cases be useable in cooperation with newer generation systems such as third generation systems (e.g., 3G) and others that are currently being developed (e.g., E-UTRAN (Evolved Universal Terrestrial Radio Access Network)).

The ability of a particular mobile terminal to access multiple systems or communicate via multiple radio access technologies (multi-RAT) is sometimes referred to as "multi-radio access" (MRA). An MRA capable terminal may therefore be enabled to transfer between different RATs (e.g., UTRAN, E-UTRAN, GERAN (GSM EDGE radio access network)). During a PS (packet switched) handover of a mobile terminal that is multi-RAT communication capable, the source RAT (e.g., the RAT with which the mobile terminal is in communication prior to handover) and the target RAT (e.g., the RAT with which the mobile terminal is in communication after completion of the handover) may conduct communications regarding the capabilities of the mobile terminal. As an example, in an inter-RAT PS handover between GERAN/UTRAN/E-UTRAN the "source adapts to target" principle is currently typically followed such that the source RAT node may send the mobile terminal capabilities in a format expected by the target RAT node. Thus, for example, a source RAT node in GERAN may be required to initiate a handover to a UTRAN target node by encoding a "Source to Target Transparent Container" as "Source RNC (radio network controller) to Target RNC Transparent Container", which may be the format expected by the target RNC. As another example applicable to E-UTRAN, a source RAT node in GERAN initiating a handover to E-UTRAN may encode the Source to Target Transparent Container as "Source eNB (evolved node B) to Target eNB Transparent Container", which may be the format expected by the target eNB. The same "source adapts to target" principle holds true in the other direction as well (e.g., from UTRAN or E-UTRAN to GERAN).

In situations in which a mobile terminal supports more RATs than just the two RATS (e.g., source and target) involved one particular handover, a target RAT receiving mobile terminal capabilities may not receive information for every RAT with which the mobile terminal is capable of communicating. This may impact future handovers since the current target RAT may not be aware of the necessary capabilities for encoding the "Source to Target Transparent" container as expected by the next target RAT. As an example, in the case of a PS handover from E-UTRAN to GERAN, the lack of being able to provide the necessary capabilities to the target RAT may lead to a handover initiation failure towards a target UTRAN. Accordingly, changes to the information exchanged for inter-RAT handovers may be desirable.

BRIEF SUMMARY OF EXEMPLARY EMBODIMENTS

A method, apparatus and computer program product are therefore provided that may enable a transfer of terminal inter-RAT capabilities in a multi-RAT environment. In this regard, for example, some embodiments of the present invention may provide a mechanism by which signaling may be provided to request terminal inter-RAT capabilities in the context of a handover in a multi-RAT environment and further to confirm the request and provide the requested information.

In an example embodiment an apparatus for enabling transfer of mobile terminal inter-RAT capabilities in a multi-RAT environment from the perspective of the capability provider is provided. The apparatus may include at least one processor and at least one memory including computer program code. The at least one memory and the computer program code may be configured, with the processor, to cause the apparatus to perform at least receiving an indication of a request for mobile terminal inter-RAT capability information relative to a particular RAT, acquiring the inter-RAT capability information in response to receipt of the indication of the request for inter-RAT capability information, and providing the inter-RAT capability information to a target base station.

In another example embodiment, a method for enabling transfer of mobile terminal inter-RAT capabilities in a multi-RAT environment from the perspective of the capability provider is provided. The method may include receiving an indication of a request for mobile terminal inter-RAT capability information relative to a particular RAT, acquiring the inter-RAT capability information in response to receipt of the indication of the request for inter-RAT capability information, and providing the inter-RAT capability information to a target base station.

In yet another example embodiment a computer program product for enabling transfer of mobile terminal inter-RAT capabilities in a multi-RAT environment from the perspective of the capability provider is provided. The computer program product may include at least one computer-readable storage medium having computer-executable program code portions stored therein. The computer-executable program code portions may include program code portions for receiving an indication of a request for mobile terminal inter-RAT capability information relative to a particular RAT, acquiring the inter-RAT capability information in response to receipt of the indication of the request for inter-RAT capability information, and providing the inter-RAT capability information to a target base station.

In an example embodiment, an apparatus for enabling transfer of mobile terminal inter-RAT capabilities in a multi-RAT environment from the perspective of the capability requester is provided. The apparatus may include at least one processor and at least one memory including computer program code. The at least one memory and the computer program code may be configured to, with the processor, cause the apparatus to at least perform receiving an indication of a request for a handover, determining whether inter-RAT capability information is available or needs to be reacquired for a plurality of potentially supportable RATs, and, in response to a determination that capability information has not been provided or needs to be reacquired for a particular RAT among the potentially supportable RATs, providing a message with an indicator bit indicative of a request for capability information for the particular RAT.

In another example embodiment, a method for enabling transfer of mobile terminal inter-RAT capabilities in a multi-RAT environment from the perspective of the capability requester is provided. The method may include receiving an indication of a request for a handover, determining whether inter-RAT capability information is available or needs to be reacquired for a plurality of potentially supportable RATs, and, in response to a determination that capability information has not been provided or needs to be reacquired for a particular RAT among the potentially supportable RATs, providing a message with an indicator bit indicative of a request for capability information for the particular RAT.

In an example embodiment, a computer program product for enabling transfer of mobile terminal inter-RAT capabilities in a multi-RAT environment from the perspective of the capability requester is provided. The computer program product may include at least one computer-readable storage medium having computer-executable program code portions stored therein. The computer-executable program code portions may include program code portions for receiving an indication of a request for a handover, determining whether inter-RAT capability information is available or needs to be reacquired for a plurality of potentially supportable RATs, and, in response to a determination that capability information has not been provided or needs to be reacquired for a particular RAT among the potentially supportable RATs, providing a message with an indicator bit indicative of a request for capability information for the particular RAT.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 6 illustrates an example of components for a PS Handover Request message including an indicator bit according to an exemplary embodiment of the present invention;

FIG. 7 illustrates an example of components for a PS Handover Complete ACK message according to an exemplary embodiment according to an exemplary embodiment of the present invention;

Figure 10:
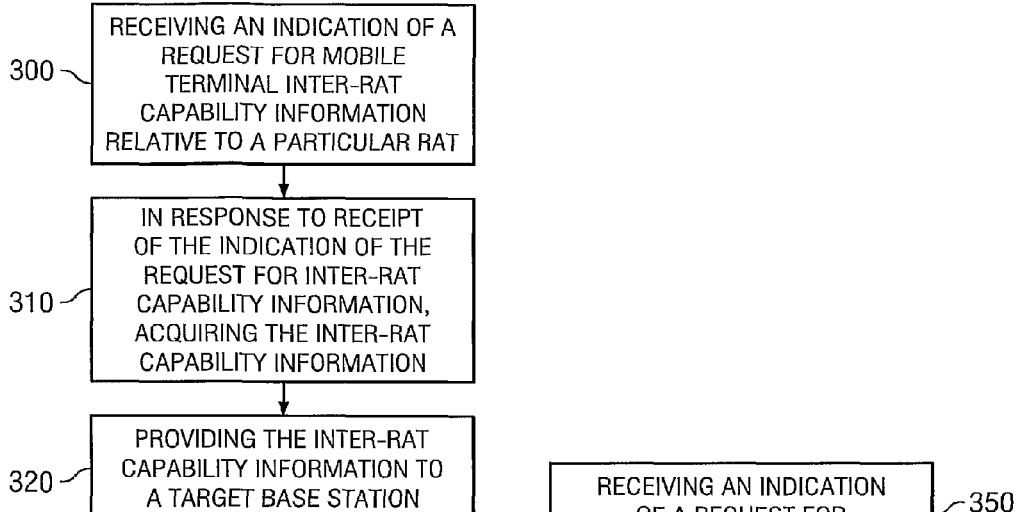
Figure 11:
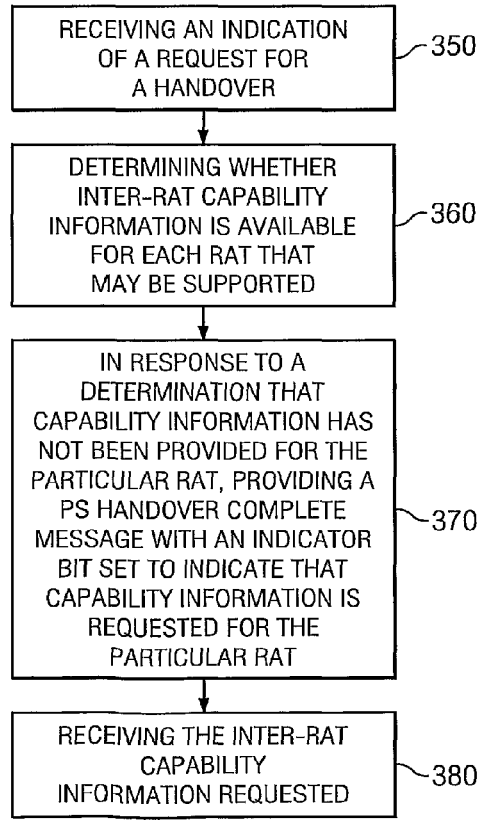

FIG. 10 is a flowchart according to an exemplary method of enabling transfer of mobile terminal inter-RAT capabilities in a multi-RAT environment according to an exemplary embodiment of the present invention; and FIG. 11 is a flowchart according to an alternative exemplary method of enabling transfer of mobile terminal inter- RAT capabilities in a multi-RAT environment according to an exemplary embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Figure 1:
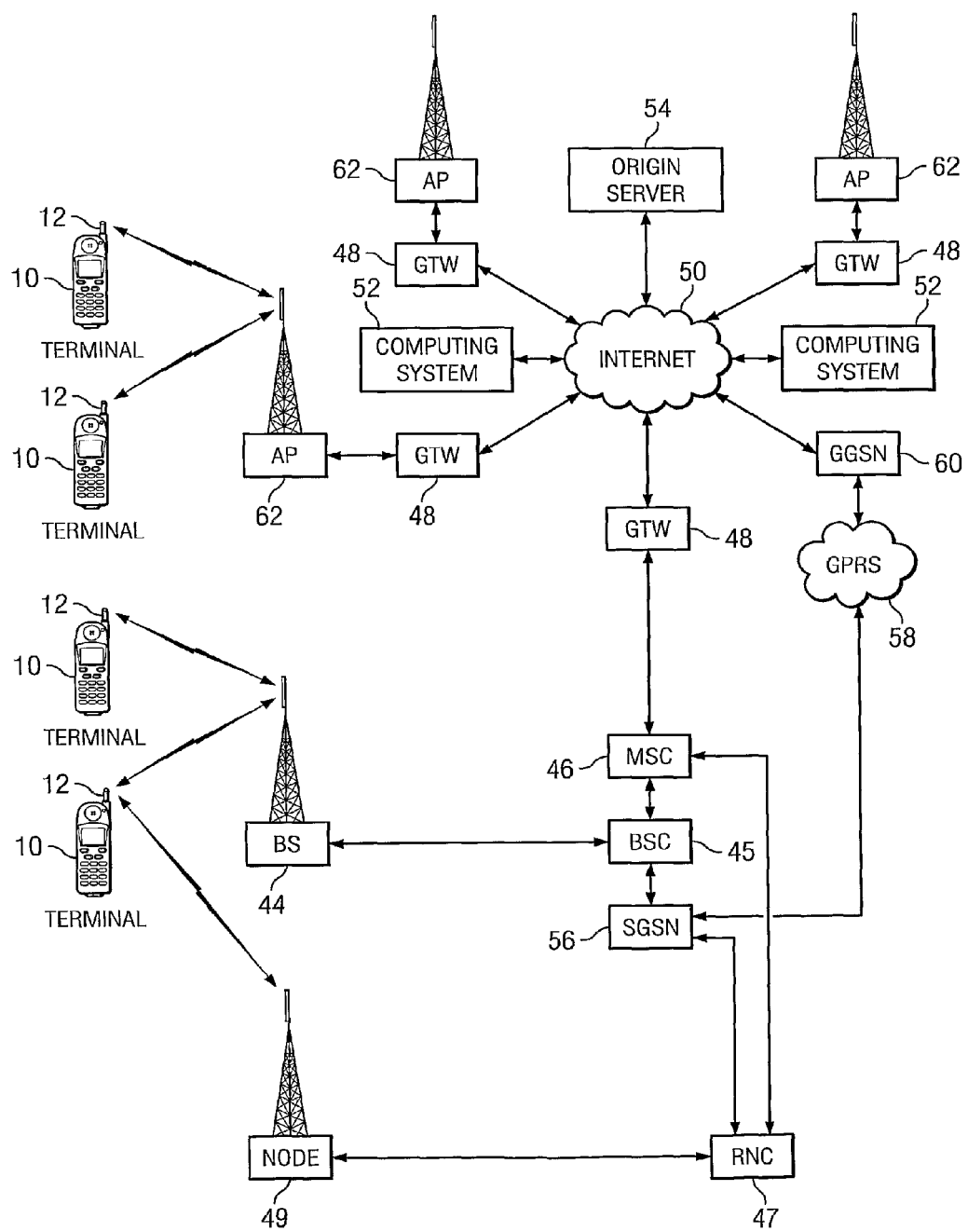
FIG. 1 is a schematic block diagram of a wireless communications system according to an exemplary embodiment of the present invention.

FIG. 1, one exemplary embodiment of the invention, illustrates a schematic block diagram of a wireless communications system according to an exemplary embodiment of the present invention. Referring now to FIG. 1, an illustration of one type of system that would benefit from embodiments of the present invention is provided. The system of FIG. 1 includes a plurality of network devices. As shown, one or more mobile terminals 10. The mobile terminals may be various different examples of mobile communication devices such as portable digital assistants (PDAs), pagers, mobile televisions, gaming devices, laptop computers, mobile phones, cameras, video recorders, audio/video players, radios, global positioning system (GPS) devices, or any combination of the aforementioned, and other types of voice and text communications devices. However, it should be understood that a mobile terminal as illustrated and hereinafter described is merely illustrative of one type of device that would benefit from embodiments of the present invention and, therefore, should not be taken to limit the scope of embodiments of the present invention.

In an exemplary embodiment, each mobile terminal 10 may include an antenna 12 (or multiple antennas) for transmitting signals to and for receiving signals from a network node such as a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 1, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one example embodiment, however, the MSC 46 is coupled to a gateway device (GTW) 48, and the GTW 48 is coupled to a WAN, such as the Internet 50. In turn, devices such as processing elements (e.g., personal computers, server computers or the like) may be coupled to the mobile terminal 10 via the Internet 50. For example, as explained below, the processing elements can include one or more processing elements associated with a computing system 52 (two shown in FIG. 1), origin server 54 (one shown in FIG. 1) or the like, as described below.

The BS 44 may also be coupled to a serving GPRS (General Packet Radio Service) support node (SGSN) 56. The SGSN 56 may be capable of performing functions similar to the MSC 46 for packet switched services. The SGSN 56, like the MSC 46, can be coupled to a data network, such as the Internet 50. The SGSN 56 can be directly coupled to the data network. In one example embodiment, however, the SGSN 56 is coupled to a packet-switched core network, such as a GPRS core network 58. The packet-switched core network of this embodiment is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telecommunications System (UMTS) network employing wideband code division multiple access (WCDMA) radio access technology or newer technologies such as E-UTRAN, which is alternately referred to as LTE (long term evolution). Some narrow-band analog mobile phone service (NAMPS), as well as total access communication system (TACS), network(s) may also benefit from embodiments of the present invention, as may dual or higher mode mobile stations.

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52.

Although not shown in FIG. 1, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In some embodiments, the mobile terminal 10 may be capable of receiving communication from multiple cells (e.g., multiple BSs or APs) at any given time. Furthermore, in some embodiments, the system of FIG. 1 could represent a multi-RAT environment. In this regard, for example, the BS 44 may be coupled to the SGSN 56 and the MSC 46 via a base station controller (BSC) 45 that may control the BS 44. The BS 44 and the BSC 45 may be associated with a first RAT (e.g., a 2G or other RAT). Meanwhile, the SGSN 56 and the MSC 46 may also be coupled to a radio network controller (RNC) 47 of a second RAT (e.g., a 3G or other RAT). The RNC 47 may in turn be in communication with one or more nodes (e.g., node-Bs or e-node-Bs) 49, one or more of which may be capable of communication with the mobile terminal 10 at any given time. As such, the mobile terminal 10 may be configured to be able to communicate with (e.g., select a cell associated with) either the first RAT or the second RAT. Furthermore, additional RATs may also be included in the system of FIG. 2 so that the mobile terminal 10 may be enabled to communicate with any of a plurality of different RATs.

Figure 2:
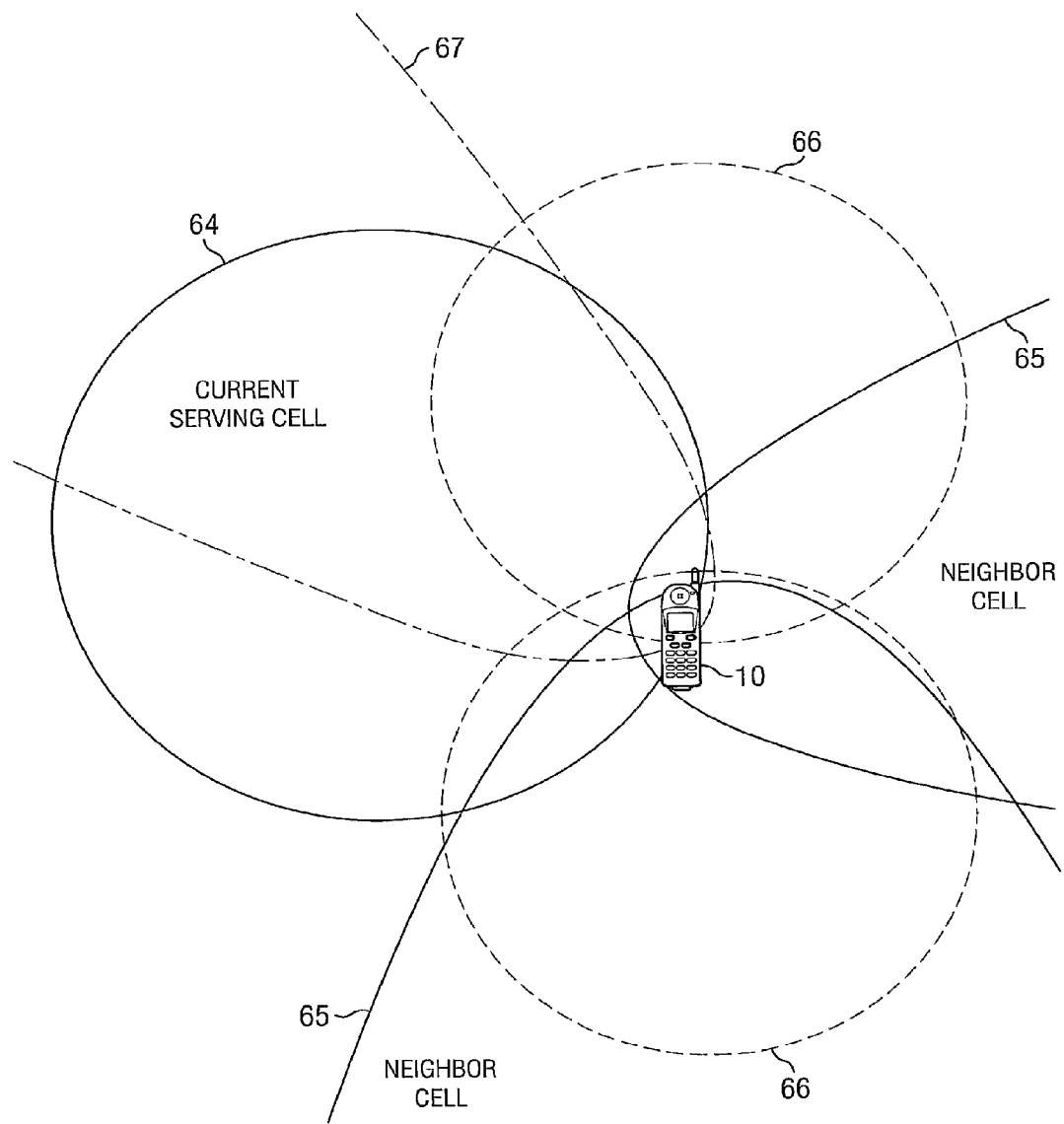
FIG. 2 illustrates an example of multiple candidate cells in a multi-RAT environment according to an exemplary embodiment of the present invention.

FIG. 2 illustrates an example of multiple different cells in a multi-RAT environment according to an exemplary embodiment. In this regard, as shown in FIG. 2, the mobile terminal 10 may be positioned in a location where the mobile terminal 10 is within range of several base stations, access points and/or nodes. In other words, the mobile terminal 10 may be within or at least proximate to a plurality of communication cells defining a coverage area of corresponding base stations, access points and/or nodes. As such, the mobile terminal 10 may be in a multi-RAT environment where cells associated with different RATs overlap to some degree. As shown in FIG. 2, the mobile terminal 10 may be in communication with a current serving cell 64, but may also be capable of receiving communications transmitted from other cells that may be from the same and/or other RATs. For example, the cells drawn in solid lines may include the current serving cell 64 and neighbor cells or first candidate cells 65, which may be associated with a first RAT (e.g., 2G, 3G, E-UTRAN, 4G or the like). In an exemplary embodiment, the current serving cell 64 and the first candidate cells 65 may each be associated with any particular RAT. Meanwhile, cells drawn in dashed lines may include second candidate cells 66 associated with a second RAT (e.g., a different RAT). Although, embodiments of the invention do not require three or more RATs, a third RAT (e.g., E-UTRAN) may also have one or more third candidate cells 67 that are receivable by the mobile terminal 10. As such, FIG. 2 merely illustrates one example of what may be considered a multi-RAT environment. According to an exemplary embodiment, all cells received by the mobile terminal 10, other than the current serving cell 64, may be considered candidates for handover of the mobile terminal 10 in case the mobile terminal 10 moves or experiences conditions with respect to the current serving cell 64 that may require or otherwise make a handover to another serving cell advantageous or desirable. Thus, for example, if communication with the current serving cell 64 is lost or if parameters associated with such communication suggest or otherwise indicate that a handover may be desirable, the mobile terminal 10 may initiate a handover to or otherwise be handed over to one of the candidate cells. When such a handover is initiated, the communication node associated with the current serving cell 64 (e.g., base station, access point or node) may be considered to be a source node associated with a corresponding source RAT. Meanwhile, the communication node associated with the cell to which service is to be handed over may be considered to be a target node associated with a corresponding target RAT.

In situations in which handovers occur between, for example, the same two RATs (e.g., GERAN to UTRAN or UTRAN to GERAN), information regarding mobile terminal capabilities for communication in each respective RAT may be available at the source node (e.g., source BS or AP) via various Third Generation Partnership Project (3GPP) technical specification (TSs) that govern such communications. For example, 3GPP TS 43.129, 3GPP TS 48.018 and 3GPP TS 24.008 describe details related to handling such information (e.g., INTER RAT HANDOVER INFO). The details include explanations or descriptions of various "transparent containers" or information elements for defining information needed to support various aspects of a handover. In this regard, values such as the START_PS and UE RAC value, which are values defined within the radio resource control (RRC) container INTER RAT HANDOVER INFO, provide information from the mobile terminal to the source node BSS via NAS (non-access stratum) signaling in order to support PS handover to UTRAN.

In an example in which an SGSN is supporting an inter-RAT PS handover to UTRAN from GERAN, the SGSN requests the mobile terminal to transfer the INTER RAT HANDOVER INFO to Attach Complete and Routing Area Update Complete messages. The SGSN then includes the INTER RAT HANDOVER INFO container in each CREATE-BSS-PFC message sent to the base station (e.g., BSS). For a handover from UTRAN to GERAN, the INTER RAT HANDOVER INFO including the START_PS and UE RAC values are sent to the BSS as part of the "Source BSS to Target BSS Container". Furthermore, the INTER RAT HANDOVER INFO is propagated to subsequent handovers to provide that the target BSS has the correct parameters to support inter-RAT handover to UTRAN.

While the situation above may work well for two RATs such as GERAN and UTRAN that are sequentially handed over between, when a third RAT such as E-UTRAN is introduced, problems may arise. In this regard, for example, for a mobile terminal starting in E-UTRAN and being handed over to GERAN, it cannot be guaranteed that the source node (e.g., eNB) sends the UTRAN INTER RAT HANDOVER INFO. In other words, when multiple RATs are potentially involved in handover operations, for a particular handover between two RATs, there is the potential that information regarding mobile terminal capabilities with respect to a third (or other) different RAT will be provided to the target node. Thus, for a subsequent handover to the third (or other) RAT, the new source node (e.g., the source node that was the target node in the prior handover) may not have capability information with respect to the third RAT. Thus, the capability information may need to be requested from the mobile terminal or UE (user equipment) or from the MME (mobile management entity).

In order to cure the deficiency described above, embodiments of the present invention may provide a mechanism by which capability information for mobile terminals (e.g., with respect to inter-RAT operation) may be transferred in a multi-RAT environment. In this regard, for example, mobile terminal inter-RAT capabilities with respect to more than just the two RATs involved in a particular handover can be provided.

Figure 3:
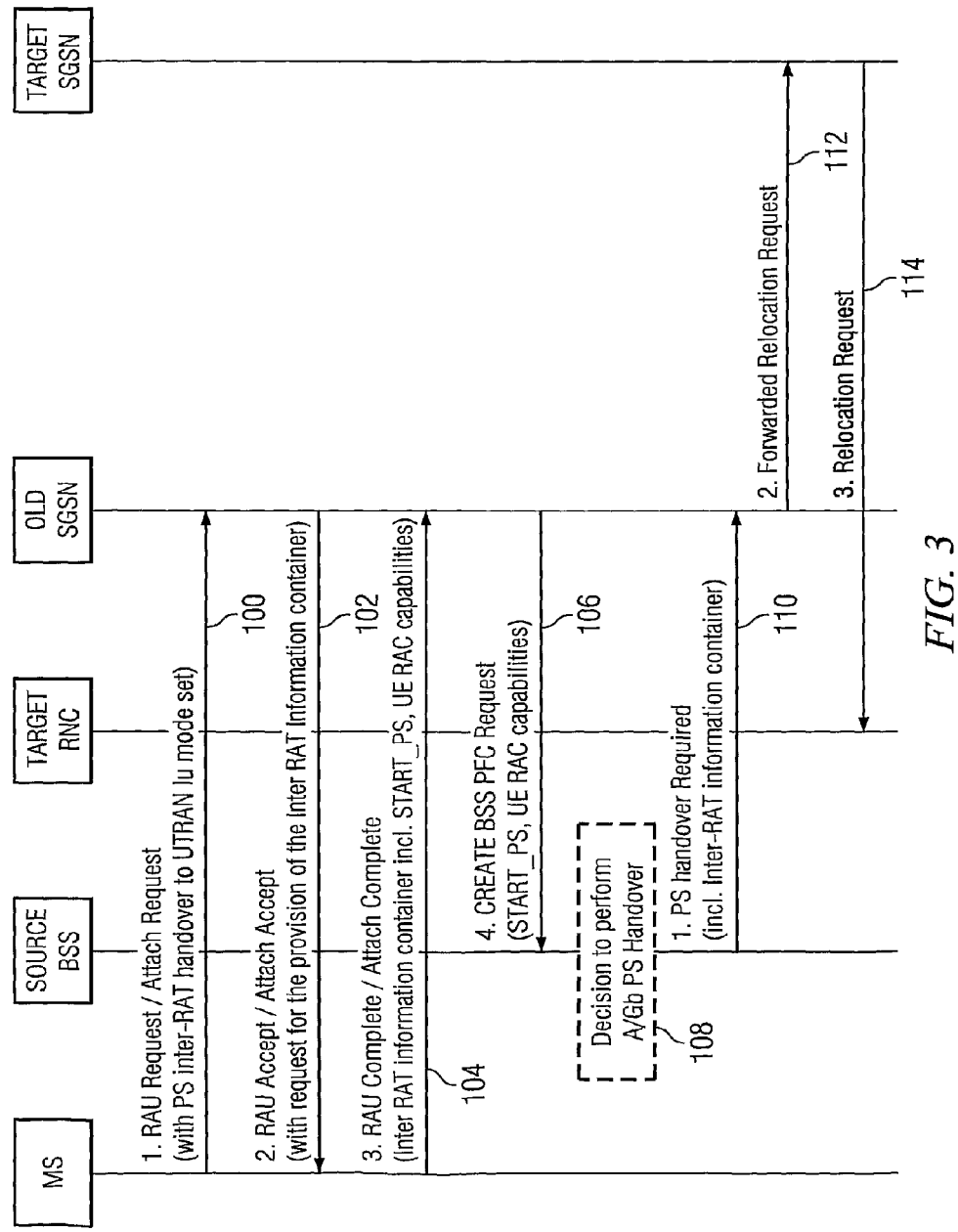
FIG. 3 illustrates a control flow diagram showing message flow for transferring capability information values according to an exemplary embodiment of the present invention.

In one exemplary embodiment, shown in FIG. 3, reception of mobile terminal capabilities with respect to inter-RAT operation may occur in response to a new BSS PFC (base station packet flow context) procedure created by the SGSN after a RAU (routing area update) procedure is completed. As such, FIG. 3 provides a control flow diagram showing message flow for transferring START_PS and UE-RAC values according to an exemplary embodiment. As shown in FIG. 3, a RAU Request or Attach Request message may be sent from a mobile station (MS) such as the mobile terminal 10 to a source SGSN (e.g. old SGSN) at operation 100. The RAU Request or Attach Request message may include PS inter-RAT handover request for a handover to another RAT (e.g., UTRAN). The old SGSN may reply with a RAU Accept or Attach Accept message at operation 102. The RAU Accept or Attach Accept message may include a request for the provision of an inter-RAT information container defining the inter-RAT capabilities of the MS. At operation 104, the MS may provide a RAU Complete or Attach Complete message to the old SGSN. The RAU Complete or Attach Complete message may provide the inter-RAT information container (e.g., including the START_PS and UE RAC capabilities) to the old SGSN. Thus, for example, the RAU Complete or Attach Complete message may provide a handover complete acknowledgement message that requests that inter-RAT capability information be forwarded to the new RAT. At operation 106, the old SGSN may send a BSS PFC Request message to the source node (e.g., the source BSS). The source BSS may then make a decision regarding the performance of a handover at operation 108. The source BSS may then provide an indication to the old SGSN that a PS handover is required at operation 110. The indication provided may include the inter-RAT information container. At operation 112, the old SGSN may forward a Relocation Request message to a target SGSN of the target RAT. The target SGSN may then communicate the Relocation Request to the target RNC (radio network controller). Accordingly, a target node associated with a target RAT may be provided with inter-RAT capability information that may be used in connection with future handovers.

However, in some cases, a handover may be requested or needed prior to BSS PFC creation. Furthermore, the SGSN may not have an awareness as to whether the base station has received the inter-RAT capability information in situations during the PS handover prior to a RAU procedure. Accordingly, FIG. 4 provides an alternative example in which a control flow diagram for signaling associated with an inter-RAT PS handover in a preparation phase is illustrated.

Figure 4:
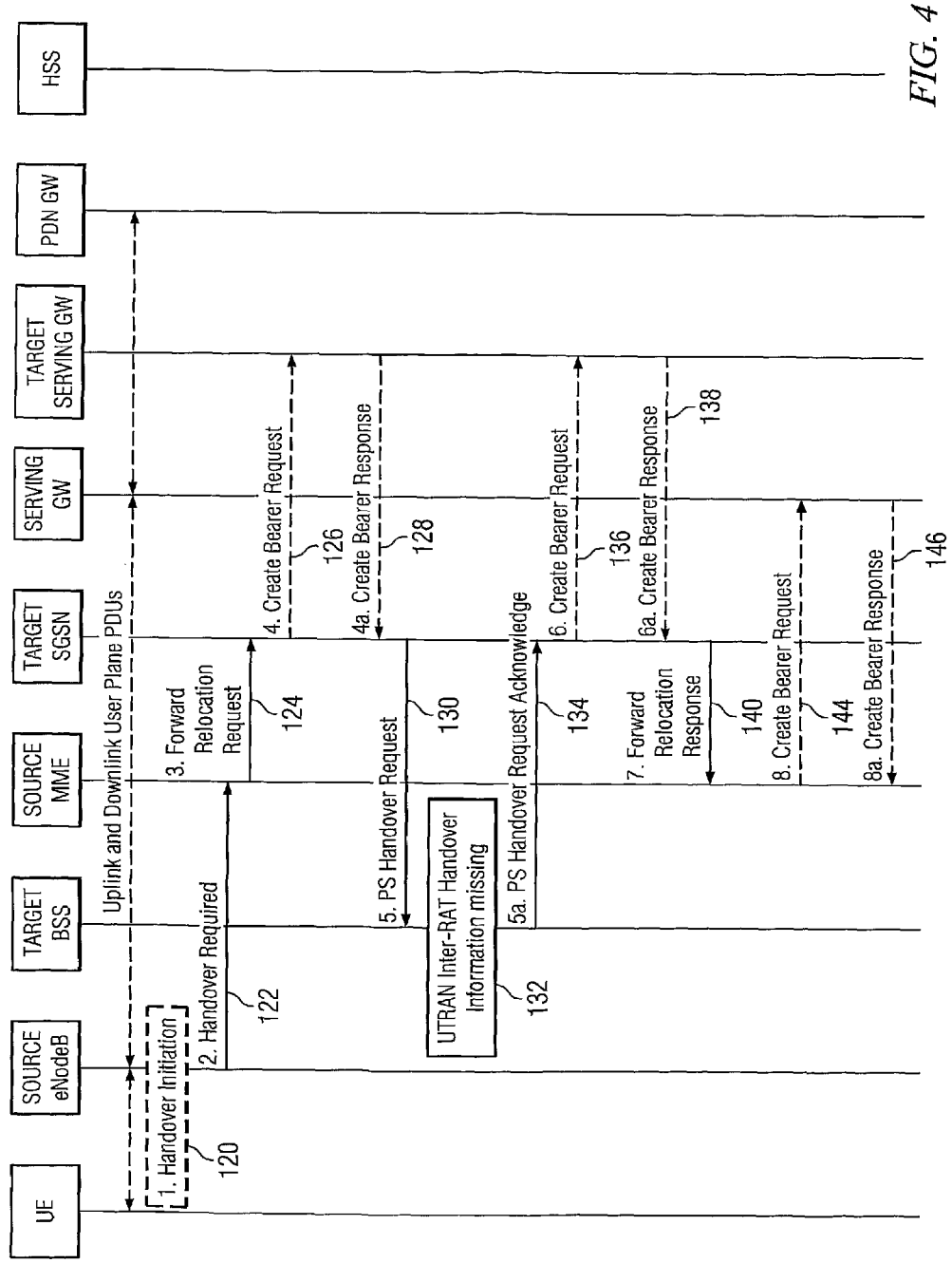
FIG. 4 illustrates a control flow diagram for signaling associated with an inter-RAT PS handover in a preparation phase according to an exemplary embodiment.

As shown in FIG. 4, uplink and downlink user plane protocol data units (PDUs) may initially be exchanged prior to handover initiation. In this example, since the source RAT is E-UTRAN, the source e-Node B may initiate handover at operation 120 for any suitable reason. The source e-Node B may send a message to the source MME at operation 122 to indicate that a handover is desired. The source MME may then forward a relocation request message to the target SGSN at operation 124. At operation 126, the target SGSN may provide a create bearer request message to the target serving gateway (GW). The target serving GW may then provide a create bearer response back to the target SGSN at operation 128. The target SGSN may then provide a PS Handover Request message to the target node (e.g., the target BSS) at operation 130. At operation 132, the target BSS may determine that UTRAN inter-RAT capability information is missing. In other words, the target BSS may be equipped with a module or may otherwise be configured to include functionality for determining whether inter-RAT capability information for a particular RAT is missing in relation to a handover between two RATs other than the particular RAT.

The target BSS may issue a PS Handover Request Acknowledge message to the target SGSN at operation 134. The target SGSN may then provide a create bearer request message to the target serving GW at operation 136 and the target serving GW may provide a create bearer response back to the target SGSN at operation 138. The target SGSN may then send a Forward Relocation Response message to the source MME at operation 140. At operation 142, the source MME may provide a Create Bearer Request message to the serving GW and the serving GW may provide a Create Bearer Response message to the source MME at operation 144.

Figure 5A:
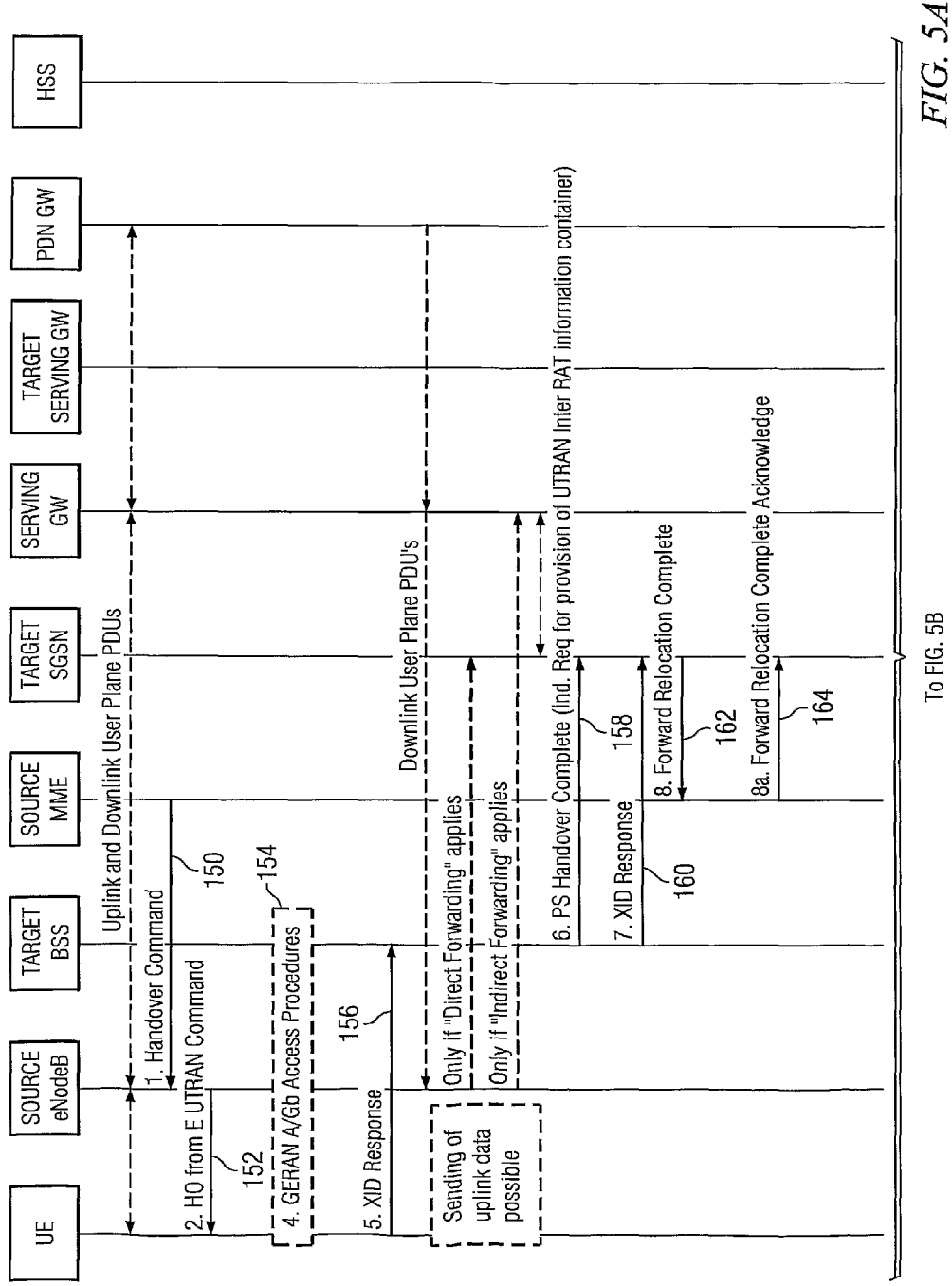
FIGS. 5A and 5B, illustrates a control flow diagram for signaling associated with an inter-RAT PS handover in an execution phase according to an exemplary embodiment.
Figure 5B:
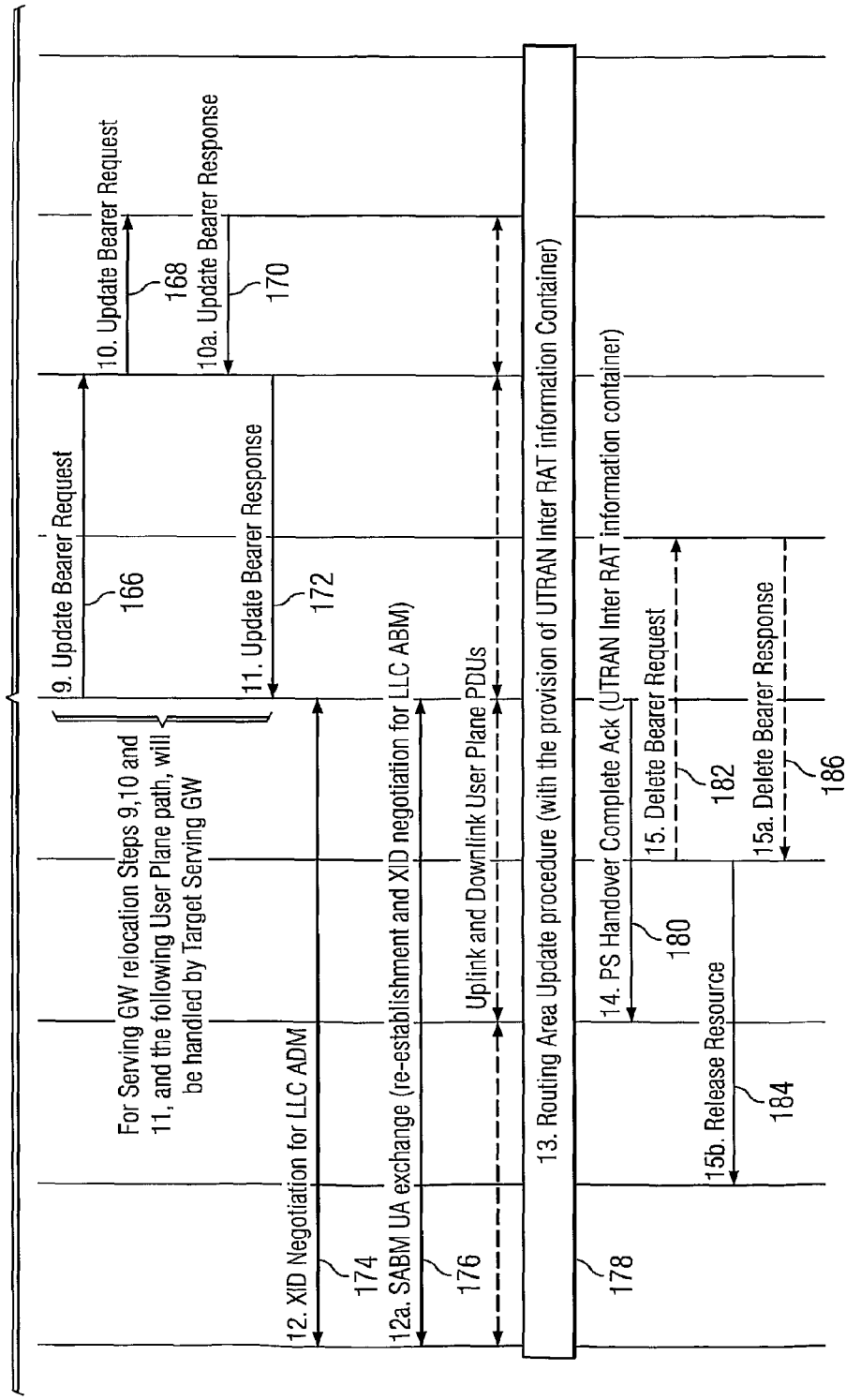

FIG. 5 illustrates a control flow diagram for signaling associated with an inter-RAT PS handover in an execution phase according to an exemplary embodiment. As shown in FIG. 5, a handover command may be sent from the source MME to the source e-NodeB at operation 150. The source e-NodeB may then provide a handover from E-UTRAN Command to the UE (e.g., the mobile terminal 10) at operation 152. GERAN access procedures may then be conducted at operation 154, after which the UE may provide a response to the target BSS (e.g., an XID (exchange identification) response) at operation 156. Thereafter, downlink user plane PDUs provided to the source e-NodeB may be forwarded in some cases to the target SGSN.

At operation 158, the target BSS may request inter-RAT capability information for the RAT not involved in the current handover from the target SGSN via a PS Handover Complete message indicating a request for provision of a UTRAN inter-RAT capability request. Further the PS handover procedure proceeds such that the target BSS may then provide an XID response to the target SGSN at operation 160. The target SGSN may then forward a Relocation Complete message to the source MME at operation 162 and receive a forwarded Relocation Complete Acknowledge message in return at operation 164. The target SGSN may then send an Update Bearer Request message to the target serving GW at operation 166. The target serving GW may send an Update Bearer Request message to the PDN GW at operation 168 and receive a response therefrom at operation 170. The target serving GW may then provide an Update Bearer Response message to the target SGSN at operation 172. At operation 174, an XID negotiation for LLC ADM may take place between the target SGSN and the UE along with SABM UA exchange at operation 176. Uplink and downlink user plane PDUs may then be exchanged between the PDN GW and the target serving GW in order to enable the target serving GW to provide PDUs to the target BSS for further exchange with the UE. At operation 178, a Routing Area Update procedure (e.g., similar to that shown in operations 100 to 104 of FIG. 3) may be accomplished in which a UTRAN inter-RAT information container is provided to the target SGSN. At operation 180, a PS Handover Complete Ack message may then be sent from the target SGSN to the target BSS with the UTRAN inter RAT information container to enable the target BSS, which will be considered the source node for the next handover, to provide inter-RAT information regarding UTRAN capabilities of the UE in a subsequent handover. The source MME may then send a Delete Bearer Request message to the serving GW at operation 182 and send a Release Resource message to the source e-NodeB at operation 184. At operation 186, the source MME may receive a Delete Bearer Response from the serving GW.

Accordingly, based on the examples above, it can be seen that some embodiments of the present invention provide a mechanism by which information regarding communication capabilities of a mobile terminal with respect to a RAT that is not involved in a current handover, but has potential for involvement in future handovers, may be requested and ultimately received at a new communication node (e.g., base station, nodeB, e-Node B or access point) upon successful PS handover. In other words, the target base station for a current handover may receive information regarding the mobile terminals capabilities with respect to communication with a RAT other than the RAT of the target base station and the RAT of the source base station. In an exemplary embodiment, a PS Handover Complete message may be used with the inclusion of a new indicator bit that requests provision of INTER RAT HANDOVER INFO for the specific RAT not involved in the current handover, but still having potential for involvement in future handovers. The SGSN may then request the capability information from the mobile terminal through a Routing Area Update procedure (e.g., as shown in FIG. 3). When the requested capability information is available at the SGSN, the SGSN may send a message including the requested capability information (e.g., INTER RAT HANDOVER INFO for the specific RAT not involved in the current handover, but still having potential for involvement in future handovers) to the target base station (e.g., via a PS Handover Complete ACK message). As such, for example, the PS Handover Complete ACK message may be a message that is only sent in response to a request for the provision of an inter-RAT information container indicator bit set accordingly. Notably, although the mechanism described herein may be applied to determining capabilities for a third RAT not involved in a handover between a first and a second RAT, embodiments could also be employed in connection with determining missing inter-RAT capability information for one of the RATs involved in the handover if such information was not otherwise available. As such, embodiments of the present invention may also be employed to request capabilities of a current RAT, if needed.

FIG. 6 includes chart 195 illustrating an example of components for a PS Handover Complete message including the indicator bit described above. FIG. 7 includes chart 197 illustrating an example of components for a PS Handover Complete ACK message according to an exemplary embodiment.

Figure 8:
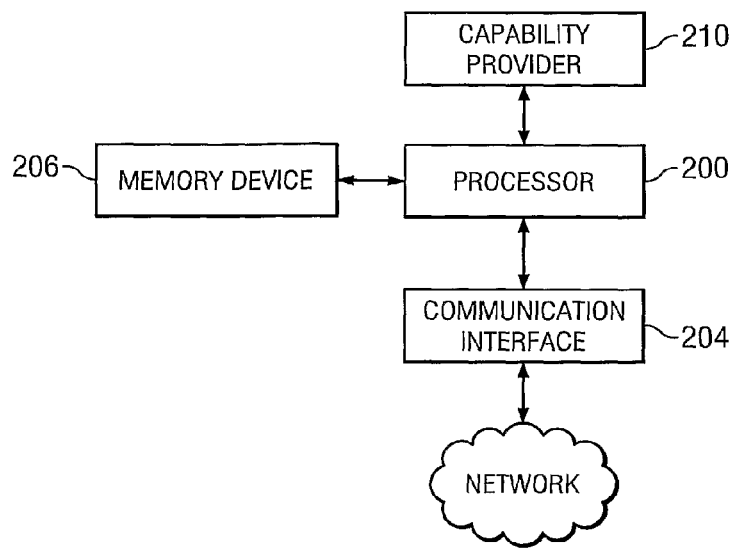
FIG. 8 illustrates a block diagram of an apparatus for enabling transfer of mobile terminal inter-RAT capabilities in a multi-RAT environment according to an exemplary embodiment of the present invention.

FIG. 8 illustrates an example apparatus for performing an exemplary embodiment of the present invention. The apparatus may be included in or embodied at a network device such as a SGSN. In this regard, the apparatus may operate in connection with the SGSN being a target SGSN for the purposes of a handover in a multi-RAT environment.

Referring now to FIG. 8, an apparatus for enabling transfer of mobile terminal inter-RAT capabilities in a multi-RAT environment is provided. The apparatus may include or otherwise be in communication with a processor 200, a communication interface 204 and a memory device 206. The memory device 706 may include, for example, volatile and/or non-volatile memory. The memory device 206 may be configured to store information, data, applications, instructions or the like for enabling the apparatus to carry out various functions in accordance with exemplary embodiments of the present invention. For example, the memory device 206 could be configured to buffer input data for processing by the processor 200. Additionally or alternatively, the memory device 206 could be configured to store instructions for execution by the processor 200. As yet another alternative, the memory device 206 may be one of a plurality of databases that store information in the form of static and/or dynamic information, for example, in association with a particular location, event or service point.

The processor 200 may be embodied in a number of different ways. For example, the processor 200 may be embodied as a processor, a coprocessor, a controller or various other processing means or devices including integrated circuits such as, for example, an ASIC (application specific integrated circuit) or FPGA (field programmable gate array). In an exemplary embodiment, the processor 200 may be configured to execute instructions stored in the memory device 206 or otherwise accessible to the processor 200. As such, whether configured by hardware or software methods, or by a combination thereof, the processor 200 may represent an entity capable of performing operations according to embodiments of the present invention while configured accordingly. Thus, for example, when the processor 200 is embodied as an ASIC, FPGA or the like, the processor 200 may be specifically configured hardware for conducting the operations described herein. Alternatively, as another example, when the processor 200 is embodied as an executor of software instructions, the instructions may specifically configure the processor 200, which may otherwise be a general purpose processing element if not for the specific configuration provided by the instructions, to perform the algorithms and operations described herein. However, in some cases, the processor 200 may be a processor of a specific device (e.g., a SGSN) adapted for employing embodiments of the present invention by further configuration of the processor 200 by instructions for performing the algorithms and operations described herein.

Meanwhile, the communication interface 204 may be embodied as any device or means embodied in either hardware, software, or a combination of hardware and software that is configured to receive and/or transmit data from/to a network and/or any other device or module in communication with the apparatus. In this regard, the communication interface 204 may include, for example, an antenna (or antennas) and supporting hardware and/or software for enabling communications with a wireless communication network. In fixed environments, the communication interface 204 may alternatively or also support wired communication. As such, the communication interface 204 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 204 may include hardware and/or software for supporting communication mechanisms such as Bluetooth, Infrared, UWB, WiFi, and/or the like.

In an exemplary embodiment, the processor 200 may be embodied as or otherwise control a capability provider 210. The capability provider 210 may be any means or device embodied in hardware, software, or a combination of hardware and software that is configured to carry out the functions of the capability provider 210 as described herein. In this regard, for example, the capability provider 210 may be configured to receive an indication of a request for inter-RAT capability information relative to a particular RAT. As described above, the indication may be in the form of an indicator bit in a PS Handover Complete message. The indicator bit may indicate not only that capability information is requested, but also indicate for which RAT the capability information is requested. In response to receipt of the indication of the request for inter-RAT capability information, the capability provider 210 may be further configured to acquire the inter-RAT capability information (e.g., via a Routing Area Update as shown in FIG. 3) and provide the inter-RAT capability information to a target base station (e.g., via the PS Handover Complete ACK message).

Figure 9:
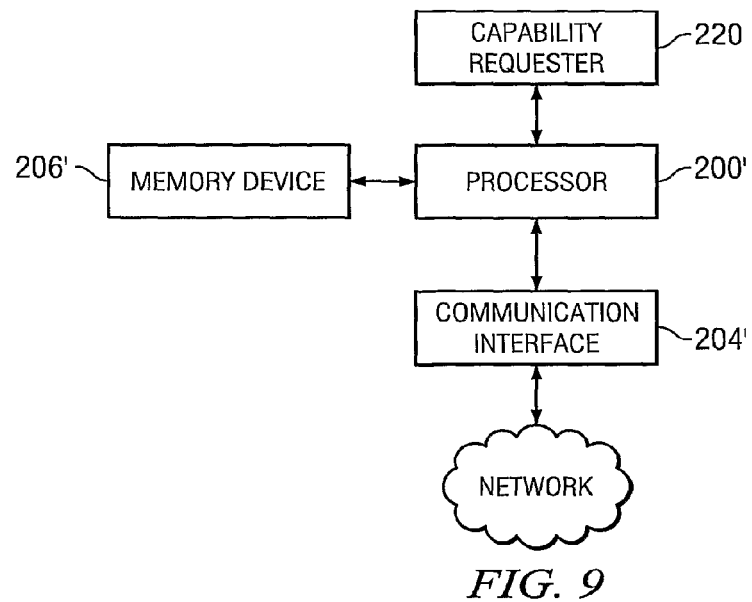
FIG. 9 illustrates a block diagram of an apparatus according to an exemplary embodiment of the present invention.

As described above, the capability provider 210 may receive the indication of the request for inter-RAT capability information via an indicator bit. FIG. 9 illustrates an example apparatus for providing the indicator bit to the capability provider 210 according an exemplary embodiment of the present invention. The apparatus of FIG. 9 may be included in or embodied at a network device such as a base station or other node. In this regard, the apparatus may operate in connection with the base station being a target BSS for the purposes of a handover in a multi-RAT environment.

Referring now to FIG. 9, an apparatus for enabling transfer of mobile terminal inter-RAT capabilities in a multi-RAT environment is provided. The apparatus may include or otherwise be in communication with a processor 200', a communication interface 204' and a memory device 206', each of which may be similar to the processor 200, the communication interface 204 and the memory device 206, respectively, described above in connection with FIG. 8.

In an exemplary embodiment, the processor 200' may be embodied as or otherwise control a capability requester 220. The capability requester 220 may be any means or device embodied in hardware, software, or a combination of hardware and software that is configured to carry out the functions of the requester 220 as described herein. In this regard, for example, the capability requester 220 may be configured to receive an indication of a request for a handover and determine whether inter-RAT capability information is available for each RAT that may be supported. Thus, for example, the capability requester 220 may determine whether capability information for the mobile terminal is available relative to a particular RAT other than the RATs involved in the current handover. In response to a determination that capability information has not been provided for the particular RAT, the capability requester 220 may provide a PS Handover Complete message with an indicator bit set to indicate that capability information is requested for the particular RAT. The capability requester 220 may be further configured to receive the inter-RAT capability information requested from the capability provider 210.

FIGS. 10 and 11 are flowcharts of a system, method and program product according to exemplary embodiments of the invention. It will be understood that each block of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a network device (e.g., an SGSN or BSS) and executed by a processor in the network device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide steps for implementing the functions specified in the flowcharts block(s).

Accordingly, blocks of the flowcharts support combinations of means for performing the specified functions, combinations of operations for performing the specified functions and program instruction means for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In this regard, one embodiment of a method for enabling transfer of mobile terminal inter-RAT capabilities in a multi-RAT environment from the perspective of the capability provider 210 as provided in FIG. 10 may include receiving an indication of a request for mobile terminal inter-RAT capability information relative to a particular RAT at operation 300. The indication may be in the form of an indicator bit in a PS Handover Complete message that indicates not only that capability information is requested, but also indicate for which RAT the capability information is requested. The method may further include, in response to receipt of the indication of the request for inter-RAT capability information, acquiring the inter-RAT capability information (e.g., via a Routing Area Update as shown in FIG. 3) at operation 310. The method may further include providing the inter-RAT capability information to a target base station (e.g., via the PS Handover Complete ACK message) at operation 320.

In this regard, one embodiment of a method for enabling transfer of mobile terminal inter-RAT capabilities in a multi-RAT environment from the perspective of the capability requester 220 as provided in FIG. 11 may include receiving an indication of a request for a handover at operation 350 and determining whether inter-RAT capability information is available for each RAT that may be supported at operation 360. Operation 360 may include determining whether capability information for the mobile terminal is available relative to a particular RAT other than the RATs involved in the current handover. The method may further include, in response to a determination that capability information has not been provided for the particular RAT, providing a PS Handover Complete message with an indicator bit set to indicate that capability information is requested for the particular RAT at operation 370. In an optional operation 380, the method may further include receiving the inter-RAT capability information requested. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving an indication of a request for a handover;
determining whether inter-radio access technology capability information of a mobile terminal is available for a plurality of potentially supportable radio access technologies not involved in the current handover between a source radio access network and a target radio access network; and
providing a message with an indicator indicative of a request for inter-radio access technology capability information for a particular radio access technology of the potentially supportable radio access technologies, wherein the message comprises a handover complete message indicating the inter-radio access technology information is requested.

2. The method of claim 1, further comprising receiving the inter-radio access technology capability information requested.

3. The method of claim 1, wherein the handover complete message comprises a packet switched handover complete message.

4. The method of claim 1, wherein the indicator comprises at least one bit.

5. A non-transitory computer-readable storage medium including computer program code which when executed by at least one processor causes operations comprising:
receiving an indication of a request for a handover;
determining whether inter-radio access technology capability information of a mobile terminal is available or needs to be acquired for a plurality of potentially supportable radio access technologies not involved in the current handover between a source radio access network and a target radio access network; and
providing a message with an indicator indicative of a request for inter-radio access technology capability information for a particular radio access technology of the potentially supportable radio access technologies, wherein the message comprises a handover complete message indicating the inter-radio access technology information is requested.

6. The non-transitory computer-readable storage medium of claim 5, further comprising receiving the inter-radio access technology capability information requested.

7. The non-transitory computer-readable storage medium of claim 5, wherein the handover complete message comprises a packet switched handover complete message.

8. The non-transitory computer-readable storage medium of claim 5, wherein the indicator comprises at least one bit.

9. An apparatus comprising at least one processor and at least one memory including computer program code, the at least one memory and the computer program code configured to, with the at least one processor, cause the apparatus to at least:
receive an indication of a request for a handover;
determine whether inter-radio access technology capability information of a mobile terminal is available or needs to be acquired for a plurality of potentially supportable radio access technologies not involved in the current handover between a source radio access network and a target radio access network; and
provide a message with an indicator indicative of a request for inter-radio access technology capability information for a particular radio access technology of the potentially supportable radio access technologies, wherein the message comprises a handover complete message indicating the inter-radio access technology information is requested.

10. The apparatus of claim 9, wherein the apparatus is further configured to at least receive the radio access technology capability information requested.

11. The apparatus of claim 9, wherein the handover complete message comprises a packet switched handover complete message.

12. The apparatus of claim 9, wherein the indicator comprises at least one bit.

* * * * *